United States Patent
Jang et al.

(10) Patent No.: US 9,521,324 B2
(45) Date of Patent: Dec. 13, 2016

(54) ELECTRONIC APPARATUS AND METHOD FOR MAIN PROCESSOR AND IMAGE PROCESSOR BOOTING

(71) Applicant: SAMSUNG ELECTRONICS CO., LTD., Suwon-si, Gyeonggi-do (KR)

(72) Inventors: Nam-young Jang, Suwon-si (KR); Sung-bin Hong, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 72 days.

(21) Appl. No.: 14/566,031

(22) Filed: Dec. 10, 2014

(65) Prior Publication Data

US 2015/0288881 A1   Oct. 8, 2015

(30) Foreign Application Priority Data

Apr. 7, 2014 (KR) .................. 10-2014-0041497

(51) Int. Cl.
H04N 5/228 (2006.01)
H04N 5/225 (2006.01)
H04N 5/232 (2006.01)

(52) U.S. Cl.
CPC .......... *H04N 5/23241* (2013.01); *H04N 5/232* (2013.01); *H04N 5/23293* (2013.01)

(58) Field of Classification Search
CPC .............. H04N 5/23241; H04N 5/3698; H04N 1/00885; G03B 2217/007; G03B 7/26; H02M 3/00; H02M 7/00; G06F 1/3203; G06F 1/325
USPC ..................................... 348/222.1, 372, 374
See application file for complete search history.

(56) References Cited

U.S. PATENT DOCUMENTS

| | | | |
|---|---|---|---|
| 6,785,892 B1* | 8/2004 | Miller | G06F 15/167 712/203 |
| 7,886,268 B2 | 2/2011 | Okabe | |
| 7,900,035 B2* | 3/2011 | Yoshida | G06F 9/4405 713/1 |
| 8,599,265 B2* | 12/2013 | Kim | G06K 9/00355 348/164 |

(Continued)

FOREIGN PATENT DOCUMENTS

| | | |
|---|---|---|
| CN | 102830996 A | 12/2012 |
| JP | 2006-259873 A | 9/2006 |

(Continued)

OTHER PUBLICATIONS

PCT Search Report and Written Opinion issued for related application PCT/KR2015/003398, Jun. 22, 2015, 12 pages.

*Primary Examiner* — Chia-Wei A Chen
(74) *Attorney, Agent, or Firm* — Drinker Biddle & Reath LLP

(57) ABSTRACT

An electronic apparatus and a method of controlling the same are described. A method of controlling an electronic apparatus having a main processor and an image processor includes: booting the main processor and the image processor according to a power input signal of the photographing apparatus; when the image processor is completely booted, performing a photographing preparation operation; photographing an object, performed by the image processor, in response to a shutter release signal; and generating photographing data of the object, performed by the image processor.

28 Claims, 13 Drawing Sheets

(56) References Cited

U.S. PATENT DOCUMENTS

| | | | | |
|---|---|---|---|---|
| 9,003,174 B2* | 4/2015 | Lai | | G06F 9/4401 713/2 |
| 9,026,775 B2* | 5/2015 | Jang | | G06F 9/4416 710/38 |
| 2003/0142217 A1* | 7/2003 | Maehama | | H04N 5/335 348/207.99 |
| 2008/0231724 A1* | 9/2008 | Wang | | H04N 5/2257 348/222.1 |
| 2008/0288711 A1* | 11/2008 | Jung | | G06F 15/16 711/102 |
| 2009/0122159 A1* | 5/2009 | Sakaue | | H04N 5/23293 348/231.99 |
| 2009/0248956 A1 | 10/2009 | Parker et al. | | |
| 2010/0115309 A1* | 5/2010 | Carvalho | | G06F 1/32 713/320 |
| 2010/0149370 A1* | 6/2010 | Kim | | H04N 5/23245 348/222.1 |
| 2010/0157067 A1* | 6/2010 | Karn | | H04N 1/00204 348/207.1 |
| 2010/0157095 A1* | 6/2010 | Karn | | G11B 27/034 348/231.1 |
| 2010/0271508 A1* | 10/2010 | Niizato | | H04N 5/232 348/231.99 |
| 2010/0283586 A1* | 11/2010 | Ikeda | | H04N 1/00007 340/10.42 |
| 2011/0055538 A1* | 3/2011 | Cho | | G06F 9/4418 713/2 |
| 2011/0093702 A1* | 4/2011 | Eom | | G03G 15/553 713/168 |
| 2012/0019687 A1* | 1/2012 | Razavi | | H04N 5/23241 348/231.6 |
| 2012/0044351 A1* | 2/2012 | Kook | | B60K 35/00 348/148 |
| 2012/0100895 A1* | 4/2012 | Priyantha | | H04W 52/0293 455/574 |
| 2013/0038746 A1* | 2/2013 | Hosokawa | | G03B 17/00 348/211.99 |
| 2013/0039602 A1* | 2/2013 | Sasaki | | G06K 9/32 382/298 |
| 2013/0042097 A1* | 2/2013 | Baik | | G06F 9/4401 713/2 |
| 2013/0042098 A1* | 2/2013 | Baik | | G06F 9/4401 713/2 |
| 2013/0093896 A1* | 4/2013 | Jeon | | G08B 13/19669 348/152 |
| 2013/0120571 A1 | 5/2013 | Lee et al. | | |
| 2013/0124207 A1* | 5/2013 | Sarin | | G10L 15/22 704/275 |
| 2013/0155279 A1* | 6/2013 | Khan | | H04N 5/335 348/231.99 |
| 2014/0015995 A1* | 1/2014 | Campbell | | H04N 5/225 348/222.1 |
| 2014/0118257 A1* | 5/2014 | Baldwin | | G06F 3/017 345/158 |
| 2014/0148227 A1* | 5/2014 | Choi | | H04N 5/23241 455/574 |
| 2014/0192206 A1* | 7/2014 | Holz | | H04N 5/23241 348/169 |
| 2014/0267842 A1* | 9/2014 | Lee | | G06F 3/14 348/262 |
| 2014/0362256 A1* | 12/2014 | Schulze | | H04N 5/23277 348/231.99 |
| 2014/0368688 A1* | 12/2014 | John Archibald | | H04N 5/23241 348/222.1 |
| 2015/0181117 A1* | 6/2015 | Park | | H04N 5/23216 348/372 |
| 2015/0229889 A1* | 8/2015 | Boettiger | | H04N 9/09 348/262 |

FOREIGN PATENT DOCUMENTS

| | | |
|---|---|---|
| JP | 2007-328534 A | 12/2007 |
| KR | 10-0768854 B1 | 10/2007 |
| KR | 10-2008-0014649 A | 2/2008 |
| KR | 10-1181735 B1 | 9/2012 |
| KR | 10-1291780 B1 | 7/2013 |

* cited by examiner

ELECTRONIC APPARATUS AND METHOD FOR MAIN PROCESSOR AND IMAGE PROCESSOR BOOTING

CROSS-REFERENCE TO RELATED PATENT APPLICATION

This application claims the priority benefit of Korean Patent Application No. 10-2014-0041497, filed on Apr. 7, 2014, in the Korean Intellectual Property Office, the disclosure of which is incorporated herein in its entirety by reference.

BACKGROUND

1. Field

One or more embodiments relate to an electronic apparatus and a method of controlling the same.

2. Related Art

A method of measuring the performance of a camera device includes a method of measuring a preparation time necessary to get ready for a photographing operation after the camera device is booted. In existing photographing devices including a main processor and an image processor, since a photographing operation is enabled only after the main processor is completely booted, a low performance preparation time is obtained.

A smartphone and a camera based on an open-source operating system (Open OS), for example, Android, may execute a camera application so as to perform a photographing operation after a time of about 10 seconds or longer has passed for cold booting.

SUMMARY

One or more embodiments include an electronic apparatus capable of rapidly performing a photographing operation before a main processor is completely booted, and a method of controlling the same.

Additional embodiments will be set forth in part in the description which follows and, in part, will be apparent from the description, or may be learned by practice of the presented embodiments.

According to an embodiment, a method of controlling an electronic apparatus having a main processor and an image processor is provided. The method includes: booting the main processor and the image processor according to a power input signal of the electronic apparatus; when the image processor is completely booted, performing a photographing preparation operation; photographing an object, performed by the image processor, in response to a shutter release signal; and generating photographing data of the object, performed by the image processor.

The method may further include: storing the generated photographing data in a storage unit of the image processor.

The storage unit may be a first storage unit. The method may further include: determining whether the main processor is completely booted, wherein, when the main processor is completely booted, photographing data stored in the first storage unit of the image processor is transmitted to a second storage unit of the main processor.

It may be determined whether the main processor is completely booted based on whether a booting complete flag of the main processor is set.

The method may further include: when the main processor is completely booted, changing a storage path of photographing data that is to be captured to the second storage unit of the main processor.

The photographing preparation operation may include at least one of driving of a lens unit and an imaging device, driving of a display unit that displays the photographing data, driving of an audio unit that controls input/output of audio data included in the photographing data, driving of a user interface unit for photographing the object, or driving of a manipulation unit that receives the shutter release signal.

The method may further include: when the main processor is completely booted, determining whether the main processor or the image processor has photographing control authorization according to a photographing mode of the electronic apparatus, wherein, when the photographing mode of the electronic apparatus is a normal mode, it is determined that the main processor has the photographing control authorization, and when the photographing mode of the electronic apparatus is a photographing optimizing mode, it is determined that the image processor has the photographing control authorization.

When it is determined that the image processor has the photographing control authorization, the image processor controls driving of a display unit that displays the photographing data, driving of an audio unit that controls input/output of audio data corresponding to the photographing data, driving of a user interface unit for photographing the object, and driving of a manipulation unit that receives the shutter release signal.

When it is determined that the main processor has the photographing control authorization, the main processor controls driving of a display unit that displays the photographing data, driving of an audio unit that controls input/output of audio data corresponding to the photographing data, driving of a user interface unit for photographing the object, and driving of a manipulation unit that receives the shutter release signal.

The method may further include: storing the generated photographing data in a shared storage unit.

The method may further include: after the main processor is completely booted, receiving a reproduction request for the photographing data, performed by the main processor; and outputting the stored photographing data on a display unit by accessing the shared storage unit, performed by the main processor.

The shared storage unit may be implemented in a chip along with the image processor.

The shared storage unit may be implemented in a chip along with the main processor.

The photographing data may include still image data or moving image data.

According to whether the main processor is completely booted, one of the image processor and the main processor may have display control authorization for displaying the generated photographing data on a display unit.

The main processor may be an application processor.

According to an embodiment, an electronic apparatus includes: a main processor and an image processor. The main processor and the image processor start being booted according to a power input signal of the electronic apparatus, and when the image processor is completely booted, the image processor performs a photographing preparation operation, photographs a predetermined object in response to a shutter release signal, and generates photographing data of the object.

The electronic apparatus may further include: a first storage unit communicatively connected to the image processor; and a second storage unit communicatively connected to the main processor, wherein the image processor stores the photographing data in the storage unit.

The image processor may determine whether the main processor is completely booted, and, when the main processor is completely booted, transmit photographing data stored in the first storage unit to the second storage unit.

The image processor may determine whether the main processor is completely booted based on whether a booting complete flag of the main processor is set.

When the main processor is completely booted, the image processor may change a storage path of photographing data that is to be captured to the second storage unit.

The electronic apparatus may further include: a lens unit, an imaging device, a display unit that displays the photographing data, an audio unit that controls input/output of audio data corresponding to the photographing data, a user interface unit for photographing the object, and a manipulation unit that receives the shutter release signal. The photographing preparation operation performed by the image processor may include at least one of driving of the lens unit and the imaging device, driving of the display unit, driving of the audio unit, driving of the user interface unit, or driving of the manipulation unit.

When the main processor is completely booted, the electronic apparatus may determine whether the main processor or the image processor has photographing control authorization according to a photographing mode of the electronic apparatus, when the photographing mode of the electronic apparatus is a normal mode, the electronic apparatus may determine that the main processor has the photographing control authorization, and when the photographing mode of the electronic apparatus is a photographing optimizing mode, the electronic apparatus may determine that the image processor has the photographing control authorization.

When the electronic apparatus determines that the image processor has the photographing control authorization, the image processor may control driving of a display unit that displays the photographing data, driving of an audio unit that controls input/output of audio data corresponding to the photographing data, driving of a user interface unit for photographing the object, and driving of a manipulation unit that receives the shutter release signal, and wherein, when the electronic apparatus determines that the main processor has the photographing control authorization, the main processor controls driving of the display unit that displays the photographing data, driving of the audio unit that controls input/output of audio data corresponding to the photographing data, driving of the user interface unit for photographing the object, and driving of the manipulation unit that receives the shutter release signal.

The electronic apparatus may further include: a shared storage unit for storing the generated photographing data.

After the main processor is completely booted, when the main processor receives a reproduction request for the photographing data, the main processor may output the stored photographing data on a display unit by accessing the shared storage unit.

The shared storage unit may be implemented in a chip along with the image processor.

The shared storage unit may be implemented in a chip along with the main processor.

The main processor and the image processor may be implemented in a same chip.

According to an embodiment, a non-transitory computer-readable recording medium having recorded thereon a computer program for executing the method described above is included.

BRIEF DESCRIPTION OF THE DRAWINGS

These and/or other embodiments will become apparent and more readily appreciated from the following description of various embodiments, taken in conjunction with the accompanying drawings in which.

DETAILED DESCRIPTION

Figure 1:
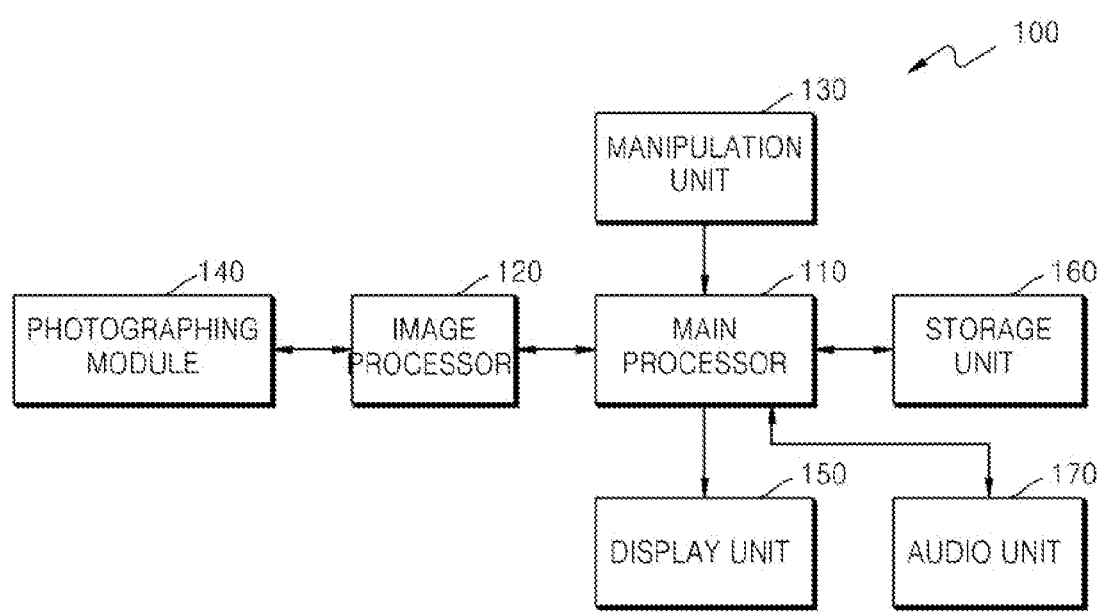
FIG. 1 is a block diagram of an electronic apparatus according to the prior art.

While various embodiments of the invention are susceptible to various modifications and alternative forms, specific embodiments thereof are shown by way of example in the drawings and will herein be described in detail. It should be understood, however, that there is no intent to limit embodiments of the invention to the particular forms disclosed, but conversely, various embodiments of the invention are to cover all modifications, equivalents, and alternatives falling within the spirit and scope of the invention. In the following description, a detailed description of known functions and configurations incorporated herein will be omitted when it may make the subject matter unclear.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

Hereinafter, various embodiments will be described in detail with reference to the attached drawings. Like reference numerals in the drawings denote like elements and thus repeated descriptions will be omitted.

FIG. 1 is a block diagram of an electronic apparatus 100 according to the related art.

Referring to FIG. 1, the electronic apparatus 100 includes a main processor 110, an image processor 120, a photographing module 140 communicatively connected to the image processor 120, a manipulation unit 130, a storage unit 160, a display unit 150, and an audio unit 170 that are communicatively connected to the main processor 110. In this regard, the electronic apparatus 100 is driven by two separate processors, i.e., the main processor 110 and the image processor 120. The main processor 110 may be an application processor, and the main processor 110 performs a photographing operation by controlling the image processor 120. In this regard, although the electronic apparatus 100 is divided into the main processor 110 and the image processor 120, the electronic apparatus 100 is not limited thereto. The electronic apparatus 100 may be driven by any other two separate processor chips, or may be designed in a single chip including two processors.

The electronic apparatus 100 may perform a camera function (e.g., an image capturing or photographing operation), and may execute various applications, for example, a voice/video call application, an Internet browser, and a multimedia player. The main processor 110 controls the camera function and the execution of the various applications. The main processor 110 controls the image processor 120 by receiving a photographing signal, for example, a shutter release signal, input via the manipulation unit 130. The image processor 120 captures an input image by driving the photographing module 140, performs predetermined image processing on the captured image, and transmits resultant image data, for example, RGB data, YUV data, or JPEG data, to the main processor 110. The main processor 110 may output a live view image transmitted via the image processor 120 or a capture quick view image to the display unit 150. The main processor 110 stores the image transmitted from the image processor 120 in the storage unit 160. In this regard, the storage unit 160 may be an embedded memory or an external memory. The electronic apparatus 100 may capture or record a still image or a moving image. In capturing of the moving image, the main processor 110 may synchronize audio data input via the audio unit 170 and recorded moving image data to output the synchronized audio data and moving image data on the display unit 150 or store the synchronized audio data and moving image data in the storage unit 160.

In the above-described embodiment of the electronic apparatus 100, since the main processor 110 and the image processor 120 have a superior-subordinate relationship, after the electronic apparatus 100 is powered on, the main processor 110 may be completely booted before a photographing operation is performed. That is, if the main processor 110 is completely booted and executes a camera application, the main processor 110 transmits a power-on signal to the image processor 120, and the image processor 120 loads firmware and is booted itself. Therefore, photographing may not be performed in such a subordinate structure as long as the main processor 110 is not completely booted. A camera based on a platform, for example, an open-source operating system (Open OS), such as Android, Window CE, etc., may execute a camera application to perform a photographing operation after a time of 10 seconds or longer has passed for cold booting, i.e., an application processor is completely booted. Accordingly, even when a real-time operating system (RTOS) based image processor has a short booting time of 1 to 2 sec., although the image processor is completely booted earlier than the application processor, the image processor needs to wait until the application processor is completely booted.

An electronic apparatus and a method of controlling the electronic apparatus according to an embodiment perform photographing before the application processor is completely booted. If a photographing input, i.e., a shutter release signal, of a user is received before the application processor is completely booted, photographing may be performed by driving only the image processor. If the image processor is completely booted, the image processor does not wait until the application processor is completely booted, and performs a photographing preparation operation. If a photographing signal is input, the image processor may perform photographing, storage, and displaying of photographing data. If the application processor is completely booted, the application processor transmits data stored in a memory to a main processor, and transmits photographing control authorization or display control authorization to the main processor. Embodiments will now be described with reference to FIGS. 2 to 9.

Figure 2:
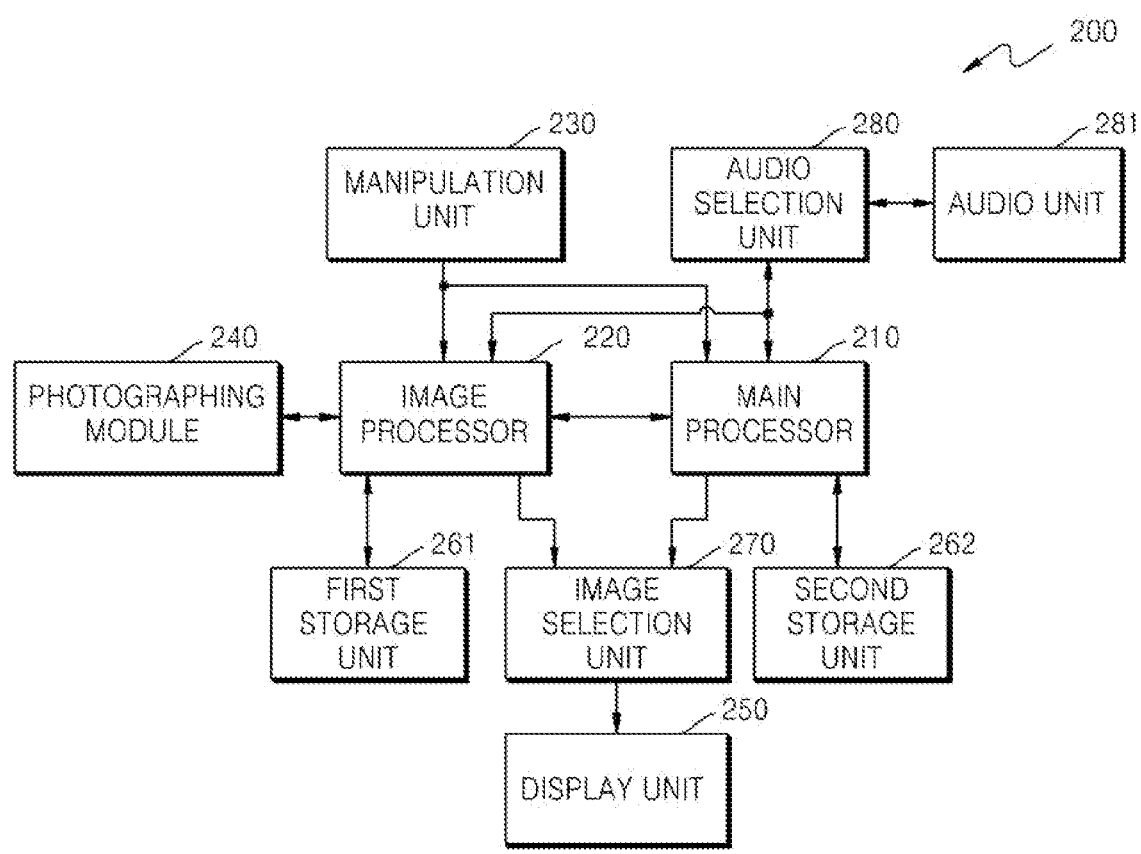
FIG. 2 is a block diagram of an electronic apparatus according to an embodiment.
Figure 3:
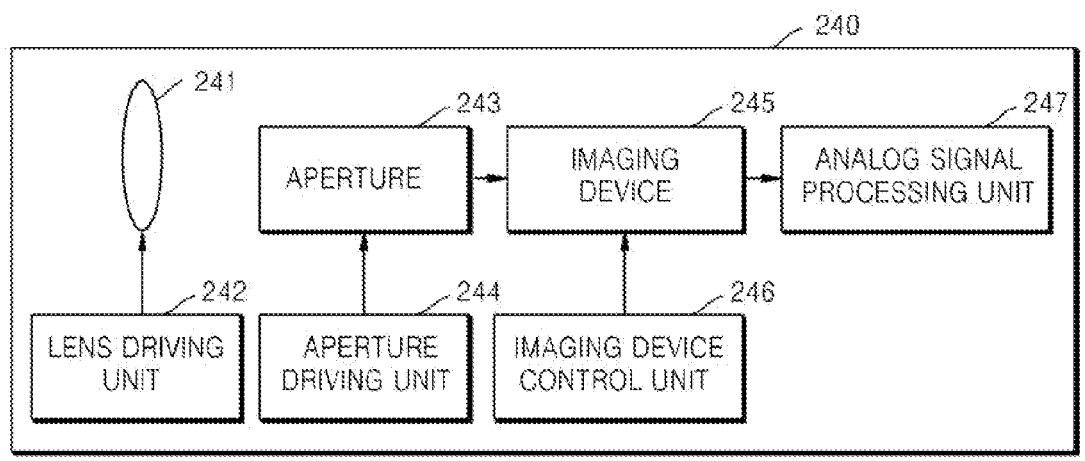
FIG. 3 is a block diagram of a photographing module of the electronic apparatus of FIG. 2.

FIG. 2 is a block diagram of an electronic apparatus 200 according to an embodiment. FIG. 3 is a block diagram of a photographing module 240 of the electronic apparatus 200 of FIG. 2.

Referring to FIG. 2, the electronic apparatus 200 includes a main processor 210, an image processor 220, the photographing module 240 and a first storage unit 261 that are communicatively connected to the image processor 220, and a second storage unit 252 communicatively connected to the main processor 210. A manipulation unit 230 and an audio selection unit 280 are communicatively connected to the main processor 210 and the image processor 220. The main processor 210 and the image processor 220 output photographing data or stored data on a display unit 250 via an image selection unit 270.

In this regard, processing of the electronic apparatus 200 is generally divided into the main processor 210 and the image processor 220. The main processor 210 may be an application processor. The electronic apparatus 200 according to an embodiment may include an Open OS based imaging device such as a smartphone, a digital camera, a Glass camera, a personal digital assistant (PDA), or a portable multimedia player (PMP), and may include a device including a main processor for controlling various applications and all functions including a photographing function, and an image processor for performing the photographing function.

The manipulation unit 230 is communicatively connected to both the main processor 210 and the image processor 220. The manipulation unit 230 is an element for receiving a control signal input from an external environment, for example, a user. The manipulation unit 230 may include one or more of a shutter release button for inputting a shutter release signal for capturing a still image by exposing an imaging device to light for a predetermined period of time, a record (REC) button for capturing a moving image, a power button for inputting a control signal for controlling power on or off, a wide-zoom button and a tele-zoom button for respectively increasing and reducing a viewing angle according to an input, or various function buttons for inputting text, selecting a mode such as a photographing mode or a reproduction mode, selecting a white balance setting function, and selecting an exposure setting function. The manipulation unit 230 may be formed as various buttons as described above but is not limited thereto, and may be formed in any other forms for receiving inputs of a user, for example, a key board, a touch pad, a touch screen, or a remote controller.

According to an embodiment, if the user presses the power button of the manipulation unit 230, a power signal is input, and the main processor 210 and the image processor 220 start being booted. In this regard, although the power signal initiates booting of the main processor 210 and the image processor 220, a different type of a booting initiation signal may be used to boot the main processor 210 and the image processor 220. The main processor 210 is booted based on an Open OS. The image processor 220 is booted based on a RTOS. In this regard, such booting may include warm booting or cold booting. The image processor 220 may be initially cold booted, may store a binary type of a processor execution code in the first storage unit 261 or in a RAM of the image processor 220, may load the processor execution code, and then may be warm booted. That is, the image processor 220 may store a setting value for facilitating driving of a camera, before the main processor 210 is booted, perform a photographing preparation operation, photograph an object in response to the shutter release signal, and generate photographing data, thereby reducing a live view time and minimizing a photographing time after being booted. In particular, the setting value for driving a lens and a photographing device, driving a live view, and facilitating display driving may be previously stored.

In a state when the main processor 210 is completely booted, or in a general state, the main processor 210 receives and processes the user input via the manipulation unit 230, and transmits a photographing related function command to the image processor 220 via a communication channel connected to the image processor 220. In the electronic apparatus 200 according to an embodiment, when the image processor 220 is completely booted and the main processor 210 is not completely booted, the image processor 220 receives and processes the user input. The user input via the manipulation unit 230 is received through a general purpose input/output (GPIO) port (not shown) of the image processor 220. Accordingly, even before the main processor 210 is completely booted, the user input, for example, the shutter release signal, is received, and a photographing operation is performed.

The image processor 220 and the main processor 210 respectively include the first storage unit 261 and a second storage unit 262 as their memories. Each of the first storage unit 261 and the second storage unit 262 may be dynamic random access memory (DRAM) or a flash memory, and the second storage unit 262 may be an embedded memory or an external memory. According to an embodiment, before the main processor 210 is completely booted, the image processor 220 performs the photographing operation via the photographing module 240 according to a photographing key value received via the manipulation unit 230, for example, the shutter release signal, and stores photographing data in the first storage unit 261. When the main processor 210 is completely booted, the image processor 220 sequentially transmits the photographing data stored in the first storage unit 261 to the main processor 210. The image processor 220 and the main processor 210 may receive and transmit image data via a mobile industry processor interface (MIPI). In the electronic apparatus 200 according to an embodiment, the MIPI may be applied to data communication between processors, i.e., the main processor 210 and the image processor 220. In general, a mobile device is greatly composed of hardware and software. In view of the hardware, various brands of processors or system on chips (SOCs) may be present within the mobile device, and are connected to a camera, a display, a memory, etc. An application program called the software is installed in the processors. The MIPI is a new standard for the hardware and the software between the processors and peripherals. According to an embodiment, the MIPI is used to transmit the photographing data between the main processor 210 and the image processor 220 but is not limited thereto. Various communication channels may be used to transmit the photographing data.

Referring to FIG. 3, the photographing module 240 may include a lens unit 241, a lens driving unit 242, an aperture 243, an aperture driving unit 244, an imaging device 245, an imaging device control unit 246, and an analog signal processing unit 247. The detailed configuration of the photographing module 240 is described with reference to FIG. 3 but is not limited thereto. Additional elements may be further included or some elements may be omitted.

The lens unit 241 focuses an optical signal. The lens unit 241 includes a zoom lens for increasing or reducing a viewing angle according to a focal length and a focus lens for focusing on an object. Each of the zoom lens and the focus lens may include one lens or a group of a plurality of lenses. The aperture 243 controls the intensity of incident light by adjusting its degree of opening. The lens driving unit 242 and the aperture driving unit 244 respectively drive the lens unit 241 and the aperture 243 according to a control signal received from the image processor 220. The lens driving unit 242 controls a focal length by adjusting the position of a lens, and performs operations such as auto focusing, zooming, and focusing. The aperture driving unit 244 adjusts the degree of opening of the aperture 243, and performs operations such as auto focusing, automatic exposure compensation, focusing, and depth of field adjusting by particularly adjusting an f number or an aperture value.

The optical signal transmitted through the lens unit 241 reaches a light-receiving surface of the imaging device 245 so as to form an image of the object. The imaging device 245 may use a charge-coupled device (CCD), a complementary metal oxide semiconductor image sensor (CIS), or a high-speed image sensor for converting the optical signal into an electric signal. The imaging device 245 may have a sensitivity controlled by the imaging device control unit 246. The imaging device control unit 246 may control the imaging device 245 according to a control signal automatically generated due to an image signal input in real time, or a control signal manually input according to a user's manipulation. An exposure time of the imaging device 245 is adjusted by a shutter (not shown). The shutter includes a mechanical shutter for adjusting incidence of light by moving a curtain, or an electronic shutter for controlling exposure by supplying an electric signal to the imaging device 245. The analog signal processing unit 247 performs one or more of noise reduction, gain adjustment, waveform regulation, and analog-digital conversion on an analog signal provided from the imaging device 245.

The main processor 210 (or a corresponding memory) stores programs such as an operating system for driving the main processor 210, and an application system, and data required for or resulting from calculation or resultant data in the second storage unit 262. When the main processor 210 is completely booted, the main processor 210 executes the programs that are stored in the second storage unit 262 and required for a photographing operation. According to an embodiment, before the main processor 210 is completely booted, the image processor 220 executes the programs for the photographing operation. However, if the main processor 210 is completely booted, the main processor 210 loads and executes the programs that are stored in the second storage unit 262 and required for the photographing operation. Before the main processor 210 according to an embodiment is completely booted, when the image processor 220 performs the photographing operation, the programs required for the photographing operation are stored in the first storage unit 261.

The display unit 250 may provide visual information and in some embodiments, auditory information to a user. In order to provide the visual information, the display unit 250 may include, for example, a liquid crystal display (LCD) panel, an organic light-emitting display (OLED) panel, an electric view finder (EVF), etc. The display unit 250 displays data output from the image processor 220 or from the main processor 210 according to a selection control signal of the image selection unit 270.

The image processor 220 processes an input image signal, and controls the other elements according to the processed image signal or an external input signal. The image processor 220 may perform image signal processing for improving image quality, for example, noise reduction, gamma correction, color filter array interpolation, color matrix, color correction, or color enhancement, on input image data. The image processor 220 may also generate an image file by compressing image data generated by performing image signal processing, or may reconstruct image data from the image file. A still image may be compressed in a reversible or irreversible format. Appropriately, the image data may be compressed in a Joint Photographic Experts Group (JPEG) format or a JPEG 2000 format. A moving image may be compressed in a Motion Picture Experts Group (MPEG) format, an audio visual interleaved (AVI) format, or an "MOV" format. The compressed data is stored in the first storage unit 261. Although the still image or the moving image captured via the photographing module 240 is compressed by the image processor 220, the image processor 220 may perform preprocessing on raw data of the captured still image or moving image, and the main processor 210 may compress the raw data and generate compressed data.

The image processor 220 may also functionally perform hue adjustment, blurring, edge enhancement, image analysis, image recognition, and application of image effects. The image recognition may include face recognition and scene recognition. For example, brightness adjustment, color correction, contrast adjustment, edge enhancement, screen splitting, character image generation, and image combining may be performed.

The image processor 220 may execute a program stored in a program storage unit (not shown), may include a separate module so as to generate control signals for controlling auto focusing, zooming, focusing, and automatic exposure compensation, and to provide the control signals to the lens driving unit 242, the aperture driving unit 244, and the imaging device control unit 246, and may control general operations of all elements included in the photographing module 240, for example, a shutter and a flash.

The image selection unit 270 outputs photographing data stored in the first storage unit 261 or in the second storage unit 262 to the display unit 250 according to a selection control signal from the main processor 210 or from the image processor 220. The image selection unit 270 may be implemented as a multiplexer, or, when the display unit 250 includes two or more display units, for example, a rear display unit of the electronic apparatus 200 and the EVF or a front display unit and the rear display unit of the electronic apparatus 200, may be implemented as a combination of a scaler that resizes the photographing data in accordance with a size of each of the front and rear display units and the multiplexer.

The audio selection unit 280 is communicatively connected to the main processor 210 and the image processor 220 and outputs audio data to the main processor 210 or the image processor 220 according to a control signal of the main processor 210 or the image processor 220. For example, for capturing a moving image, before the main processor 210 is completely booted, the audio selection unit 280 receives moving image data input through the photographing module 240 according to the control of the image processor 220 and audio data corresponding to the moving image data from the audio unit 281 and outputs the moving image data and the audio data to the image processor 220. The image processor 220 synchronizes and stores the moving image data and the audio data in the first storage unit 261. After the main processor 210 is completely booted, when the moving image is captured or a stored moving image is reproduced according to the control of the main processor 210, the audio selection unit 280 synchronizes and stores the moving image data input through the photographing module 240 and the audio data corresponding to the moving image data in the second storage unit 262, or, when a moving image stored in the second storage unit 272 is reproduced, the main processor 210 outputs the moving image data to the display unit 250 via the image selection unit 270 and the audio data to the audio unit 281 via the audio selection unit 280 by using a moving image file stored in the second storage unit 262 or an external memory (not shown).

The audio unit 281 includes a microphone that receives audio, a speaker that outputs the audio, and an audio codec that codes/decodes the audio data, and inputs and outputs the selection control signal and the audio data of the audio selection unit 280.

According to an embodiment, a case where the electronic apparatus 200 captures a still image or a moving image by implementing fast booting will now be described.

If the main processor 210 and the image processor 220 receive a signal from a power button of the manipulation unit 230 or a power key, the main processor 210 and the image processor 220 are simultaneously booted or the image processor 220 is firstly booted. In this regard, the image processor 220 may be RTOS booted, and a booting time of the image processor 220 is shorter than that of the main processor 210. The image processor 220 is set to have display control authorization for displaying photographing data on the display unit 250 and an audio control authorization, processes the photographing data input through the photographing module 240, and outputs a live view image on the display unit 250. In addition, the image processor 220 processes audio data input through the microphone of the audio unit 281, and outputs the audio data through the speaker of the audio unit 281. The image processor 220 controls the photographing module 240 to photograph the object when receiving a photographing signal, i.e. a shutter release signal or a moving image REC signal, through the manipulation unit 230. The image processor 220 itself may provide a user interface (UI) or a graphical user interface (GUI) for photographing control, and may perform various input commands received through the manipulation unit 230. The image processor 220 stores photographing data, still image data, or moving image data in the first storage unit 261. In this regard, the photographing data may be raw data or compressed data. In the moving image data, the image processor 220 may synchronize the moving image data and the audio data input through the audio selection unit 280 and store the synchronized moving image data and audio data in the first storage unit 261. When the main processor 210 is completely booted, the main processor 210 sets a booting complete flag. If the image processor 220 acknowledges the booting complete flag, the image processor 220 transmits the photographing data temporally stored in the first storage unit 261 to the second storage unit 262 of the main processor 210. The photographing data may be automatically or sequentially transmitted to the second storage unit 262. For example, when a plurality of pieces of photographing data is stored in the first storage unit 261, the photographing data stored in the first storage unit 261 may be sequentially transmitted in a time sharing manner. The image processor 220 may change a storage path of photographing data that is to be captured in the future as the second storage unit 262 of the main processor 210.

According to an embodiment, how to set photographing control authorization according to a photographing mode of the electronic apparatus 200 will now be described.

In this regard, the photographing mode is a mode for optimizing photographing performance of the electronic apparatus 200 or a normal mode. For example, the photographing mode for optimizing photographing performance may include a program mode, an aperture preference mode, a shutter preference mode, a manual mode, etc. The normal mode may include an Open OS based mode and a smart mode. In the above-described embodiment, even if the main processor 220 is completely booted, when the image processor 220 has the photographing control authorization, the image processor 220 performs, for example, display control, audio input/output control, providing of a UI, receiving of a user input, etc. so as to optimize the performance of the electronic apparatus 200. Thus, the same performance as that of a technical electronic apparatus may be implemented without delaying an image. However, in the normal mode, the main processor 210 has the photographing control authorization, and the image processor 220 may transmit the still image data and the moving image data to the main processor 210, and the main processor 210 may store the photographing data and the audio data in the second storage unit 262.

Figure 4:
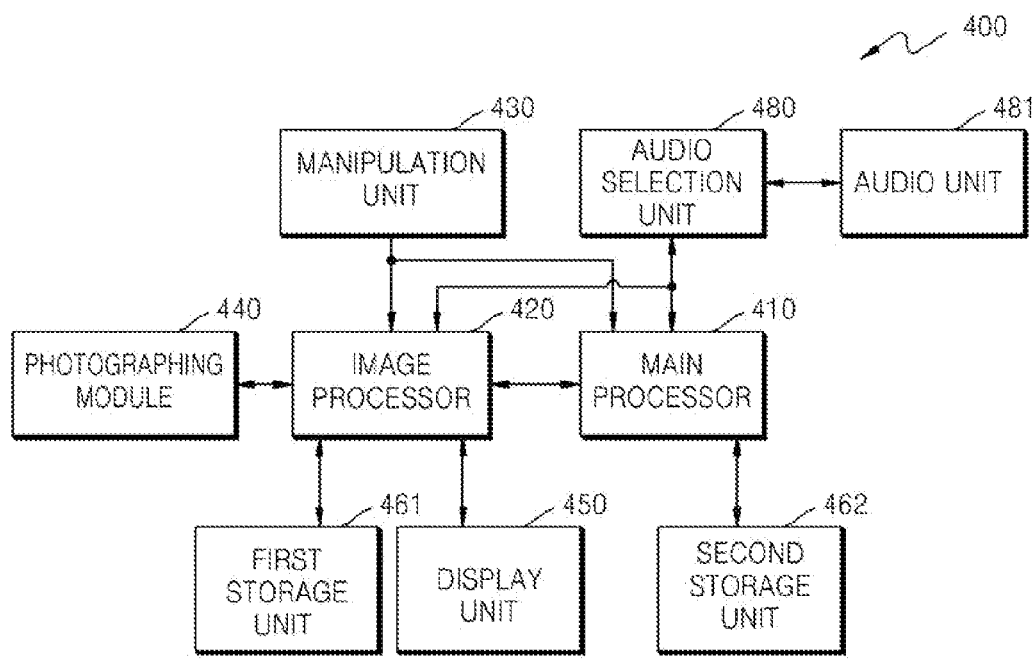
FIG. 4 is a block diagram of an electronic apparatus according to another embodiment.

FIG. 4 is a block diagram of an electronic apparatus 400 according to another embodiment.

Differences between the present embodiment and the previous embodiment of FIG. 2 are described, and descriptions that are the same therebetween are not repeated. The electronic apparatus 400 includes a main processor 410, an image processor 420, a manipulation unit 430, a photographing module 440, a display unit 450, a first storage unit 461, a second storage unit 462, an audio selection unit 480, and an audio unit 481.

Referring to FIG. 4, unlike the previous embodiment of FIG. 2, a display unit 450 is connected to an image processor 420, and the image selection unit 270 of FIG. 2 is omitted. That is, in the electronic apparatus 400 of FIG. 4, a function module for selecting an image, i.e. for performing display control authorization, is integrated into the image processor 420, and the display unit 450 is connected to the image processor 420. The image processor 420 may include a function of a multiplexer that selectively outputs photographing data of the image processor 420 or the main processor 410 to the display unit 450, or functions of the multiplexer and a scaler. In this case, the image processor 420 displays photographing data, live view data, still image data, and moving image data on the display unit 450 through signal transmission, thereby achieving a prompt display without a delay. After the main processor 410 is completely booted, when the main processor 410 has the display control authorization, the main processor 410 may transmit the photographing data to the image processor 420 and output the photographing data on the display unit 450.

Figure 5:
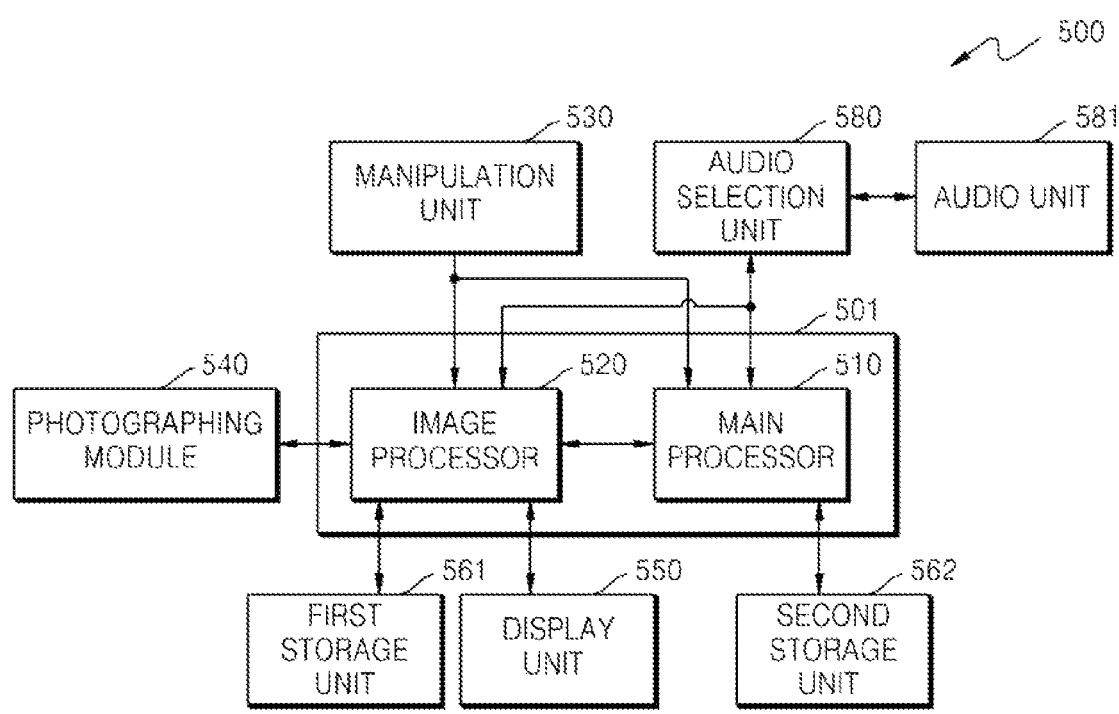
FIG. 5 is a block diagram of an electronic apparatus according to another embodiment.

FIG. 5 is a block diagram of an electronic apparatus 500 according to another embodiment.

Differences between the present embodiment and the previous embodiment of FIG. 4 are described, and descriptions that are the same therebetween are not repeated. The electronic apparatus 500 includes a main processor 510, an image processor 520, a manipulation unit 530, a photographing module 540, a display unit 550, a first storage unit 561, a second storage unit 562, an audio selection unit 580, and an audio unit 581.

Referring to FIG. 5, unlike the previous embodiment of FIG. 4, a main processor 510 and an image processor 520 of the electronic apparatus 500 are implemented as a single chip 501. In a structure of the chip 501, the main processor 510 may transmit photographing data and output the photographing data on a display unit 550 through a communication channel of the chip 501, thereby achieving a prompt display without a delay.

Figure 6:
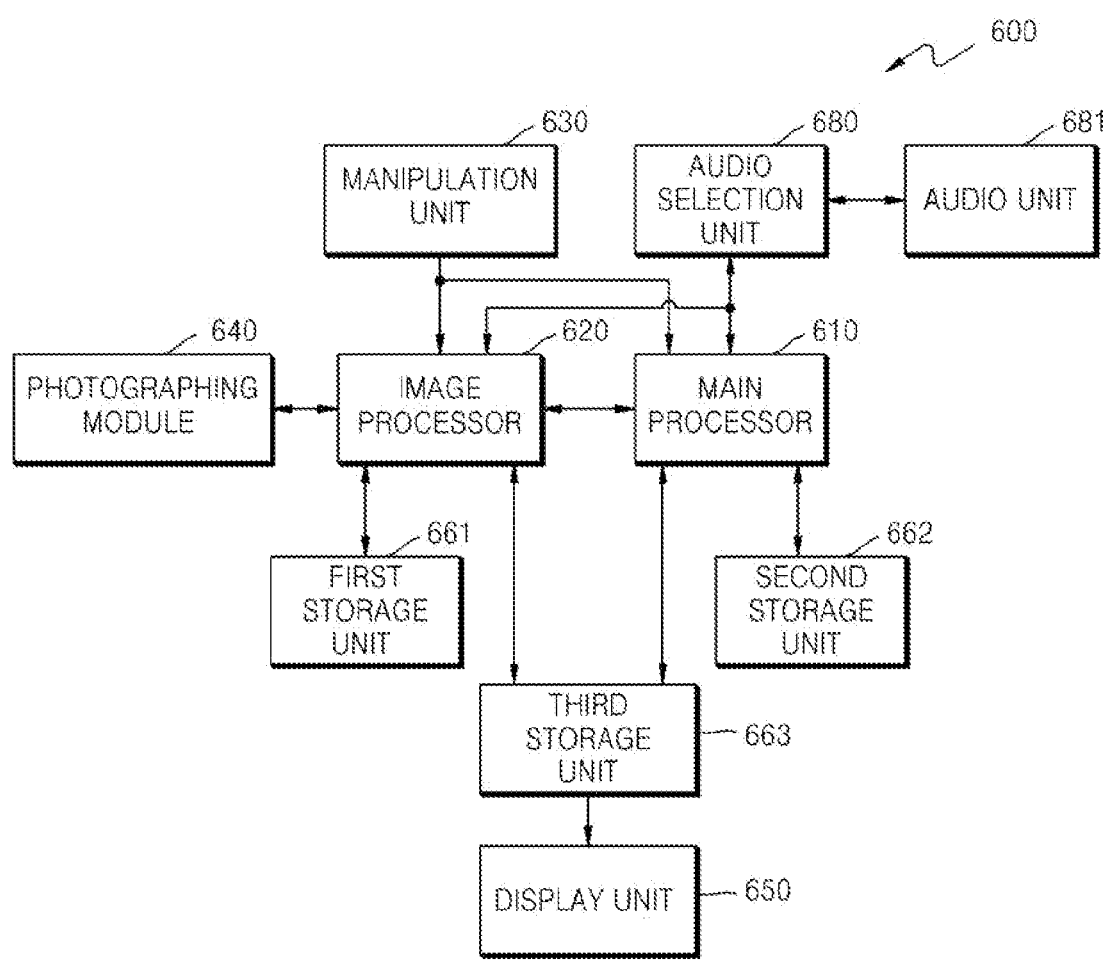
FIG. 6 is a block diagram of an electronic apparatus according to another embodiment.

FIG. 6 is a block diagram of an electronic apparatus 600 according to another embodiment.

Referring to FIG. 6, the electronic apparatus 600 includes a main processor 610, an image processor 620, a photographing module 640 and a first storage unit 661 that are connected to the image processor 620, a second storage unit 662 connected to the main processor 610, and a third storage unit 663 commonly connected to the main processor 610 and the image processor 620. A manipulation unit 630 and an audio selection unit 680 are communicatively connected to the main processor 610 and the image processor 620. An audio unit 681 is communicatively connected to the audio selection unit 680. The main processor 610 and the image processor 620 store photographing data or storage data through the third storage unit 663 and output the photographing data or the storage data on a display unit 650. For example, before the main processor 610 is completely booted, the photographing data input through the photographing module 640 is stored in the third storage unit 663 or is output to the display unit 650 according to the control of the image processor 620. In this case, the image processor 620 may provide an address of the photographing data stored in the third storage unit 663 to the main processor 610. After the main processor 610 is completely booted, when there is a request to reproduce the photographing data, the third storage unit 663 is accessed to output the stored photographing data on the display unit 650. That is, the main processor 610 and the image processor 620 may share a memory, store the photographing data or the photographing data and audio data in the shared memory, and output the photographing data or the photographing data and the audio data on the display unit 650. Although the third storage unit 663 is separated from the first and second storage units 661 and 662 in FIG. 6, the third storage unit 663 may be a region within the same memory as that of the first storage unit 661 or the second storage unit 662.

Figure 7:
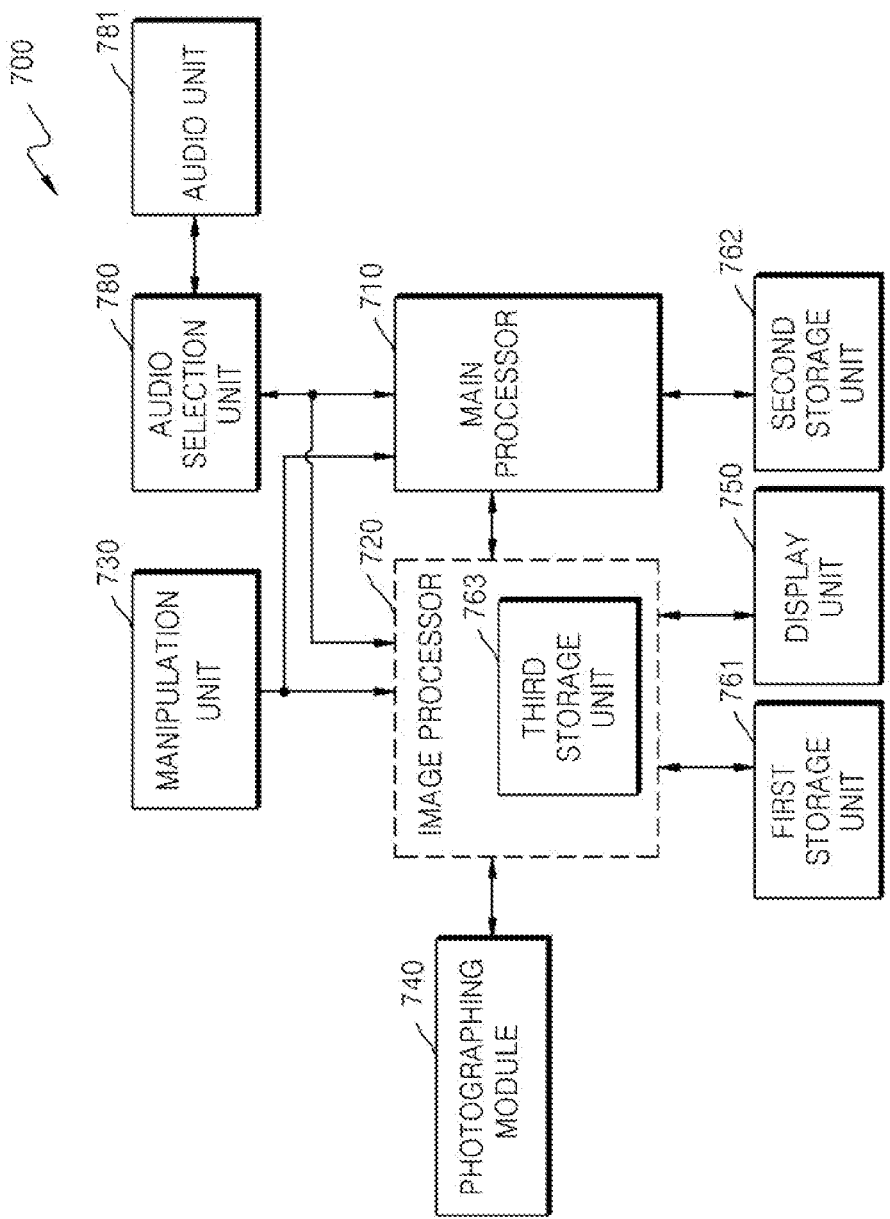
FIG. 7, FIG. 8, and FIG. 9 are block diagrams of third storage units that are various examples of a third storage unit of FIG. 6.
Figure 8:
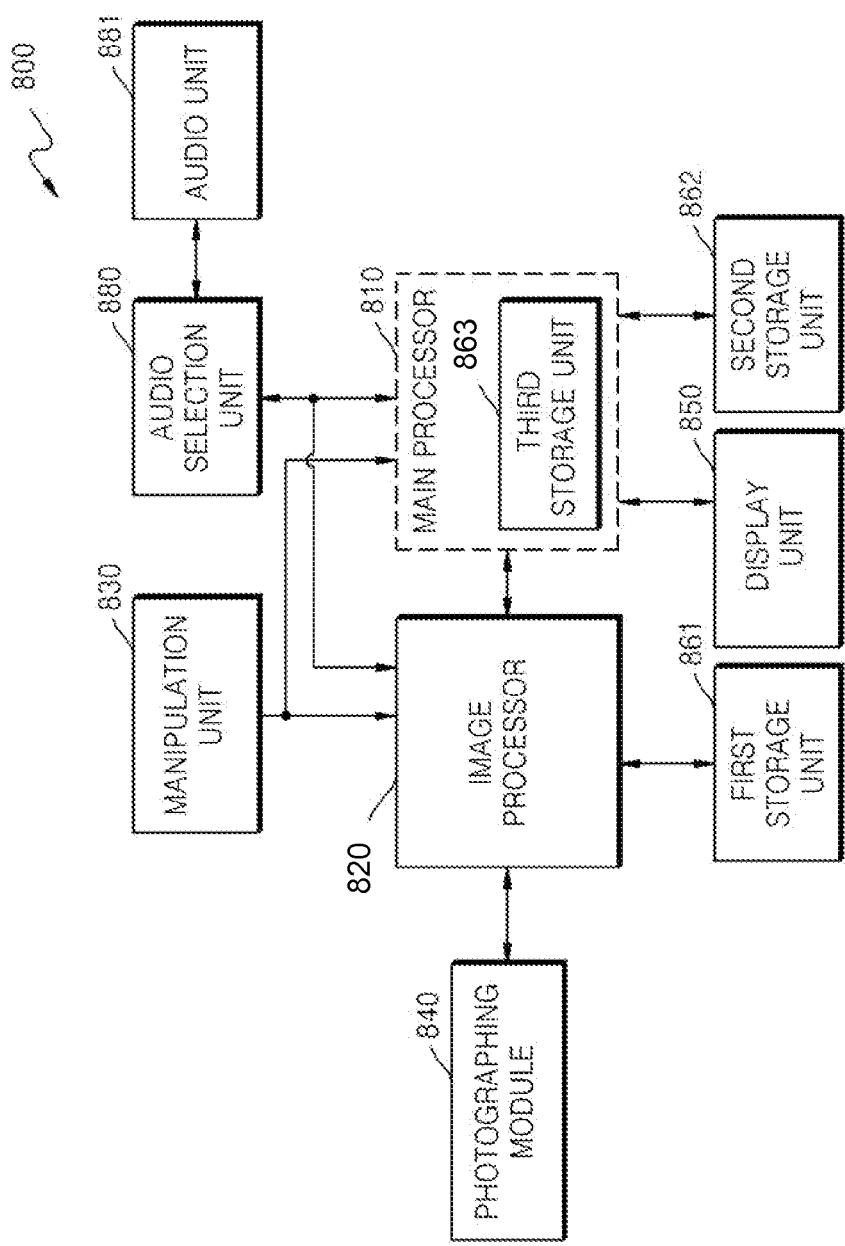
Figure 9:
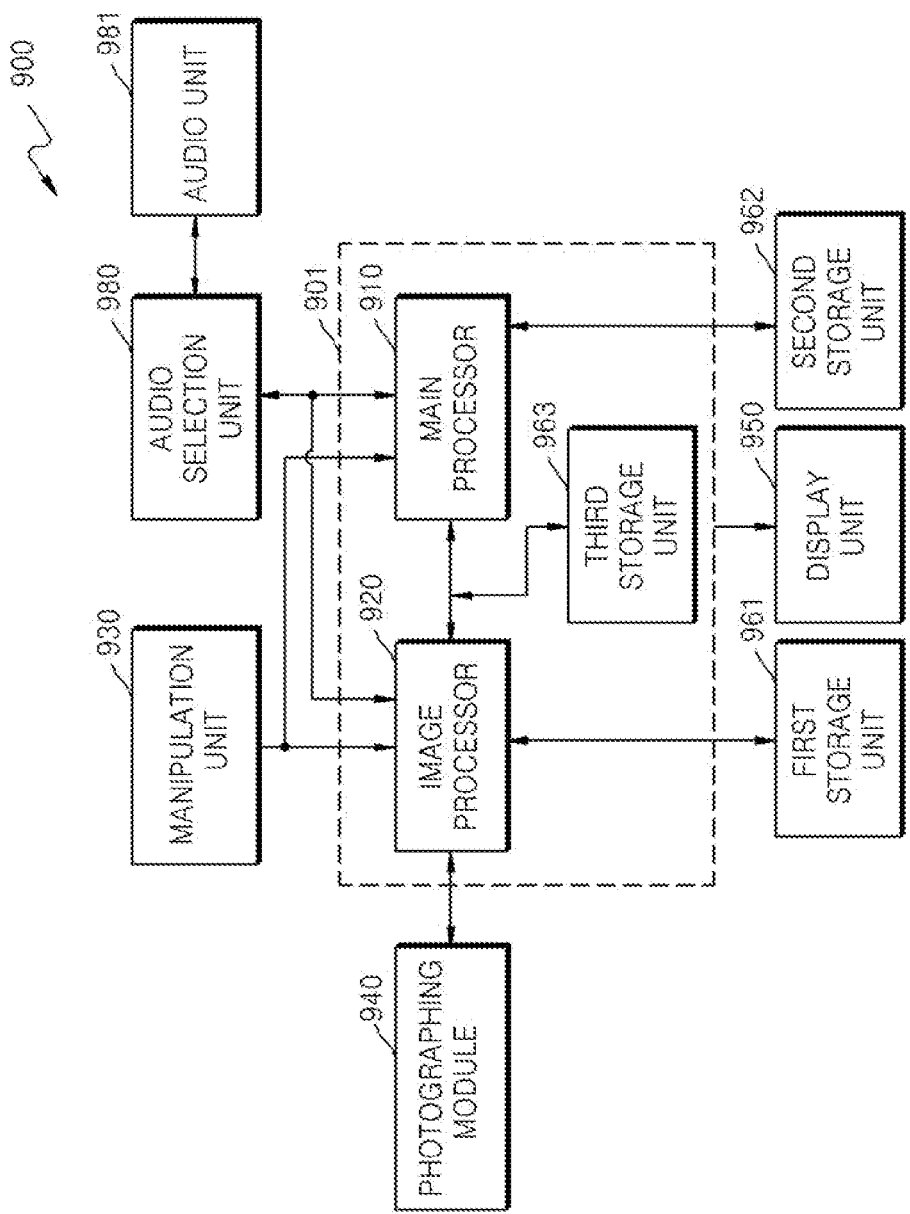

FIG. 7, FIG. 8, and FIG. 9 are block diagrams of electronic apparatuses 700, 800, and 900 having third storage units 763, 863, and 963, respectively, that are various examples of the third storage unit 663 of FIG. 6.

The electronic apparatus 700 includes a main processor 710, an image processor 720, a manipulation unit 730, a photographing module 740, a display unit 750, a first storage unit 761, a second storage unit 762, an audio selection unit 780, and an audio unit 781. Referring to FIG. 7, the third storage unit 763 may be positioned in the image processor 720.

The electronic apparatus 800 includes a main processor 810, an image processor 820, a manipulation unit 830, a photographing module 840, a display unit 850, a first storage unit 861, a second storage unit 862, an audio selection unit 880, and an audio unit 881. Referring to FIG. 8, the third storage unit 663 may be positioned in the main processor 810. In this case, a display unit is connectable to an image processor 720 or a main processor 810 but is not limited thereto.

The electronic apparatus 900 includes a main processor 910, an image processor 920, a manipulation unit 930, a photographing module 940, a display unit 950, a first storage unit 961, a second storage unit 962, an audio selection unit 980, and an audio unit 981. Referring to FIG. 9, as shown in FIG. 5, a main processor 910, an image processor 920, and the third storage unit 963 are positioned in a chip 901.

Figure 10:
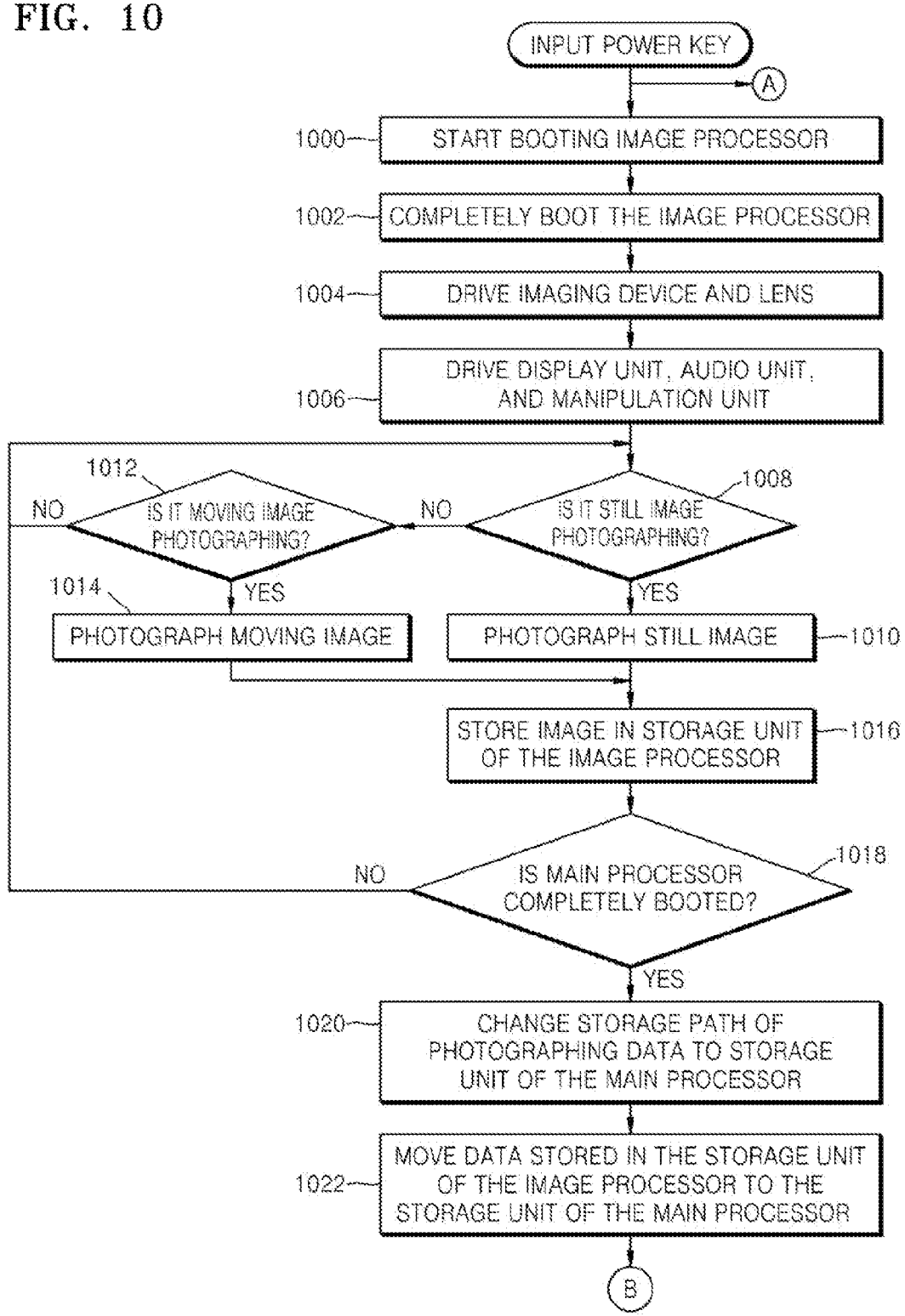
FIG. 10, FIG. 11, and FIG. 12 are flowcharts of a method of controlling an electronic apparatus according to embodiments.
Figure 11:
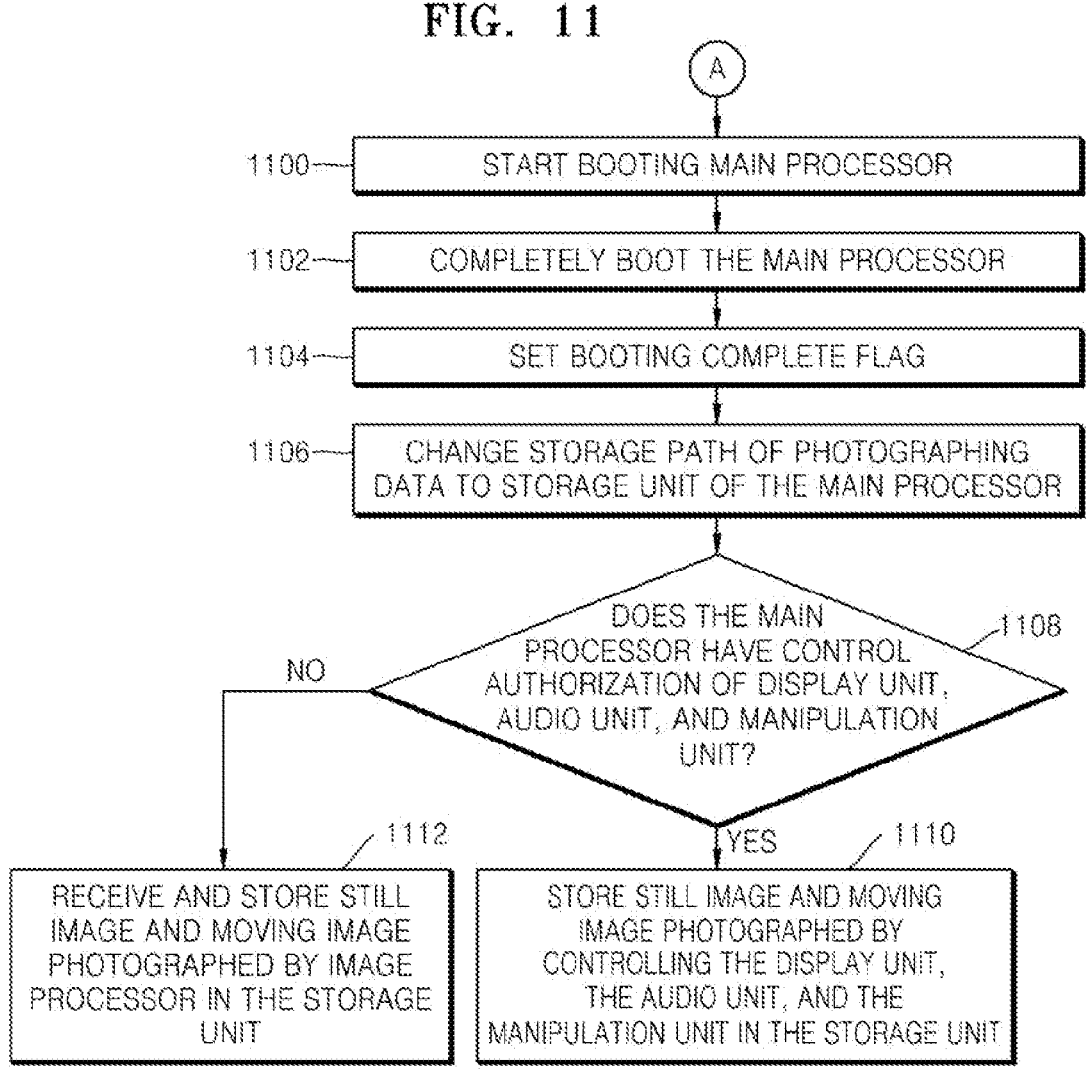
Figure 12:
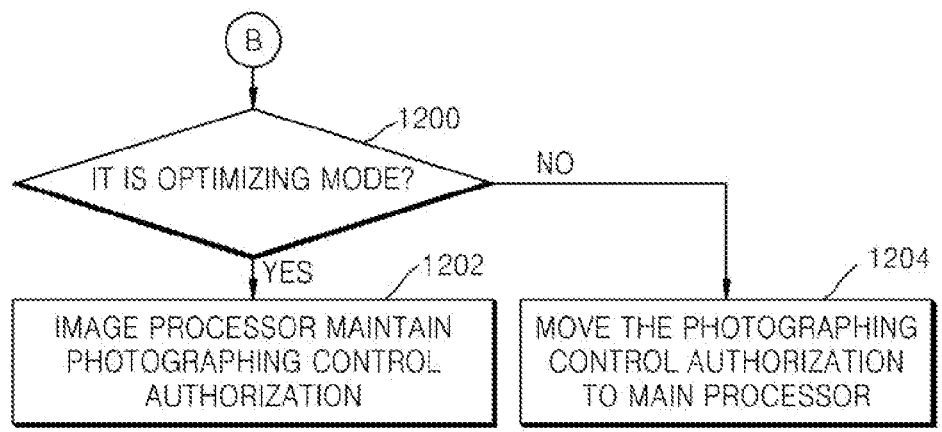

FIG. 10, FIG. 11, and FIG. 12 are flowcharts of a method of controlling an electronic apparatus according to an embodiment.

Referring to FIG. 10, if a power key is input to the electronic apparatus, in operation 1000, an image processor (e.g., image processor 220, 420, 520, 620, 720, 820, or 920) starts being booted. In this regard, the image processor may be cold booted or warm booted. The image processor is RTOS booted and has a shorter booting time than a main processor.

In operation 1002, the image processor is completely booted, and then in operation 1004, an imaging device and a lens are driven. In operation 1006, a display unit, an audio unit, and a manipulation unit (e.g., as shown in FIGS. 2 and 4-9) are driven. In addition to the elements of operations 1004 and 1006, a module for preparing for photographing may be driven. In this case, the image processor selects photographing data output by the image processor to display the photographing data on the display unit, and, when a moving image is photographed, selects audio data input by the audio unit to output the audio data on the display unit. Although not shown, a live view image for photographing a still image or the moving image input through a lens and an imaging device may be output on the display unit.

In operation 1008, when a shutter release signal is input, in operation 1010, the still image is captured. In operation 1012, when a moving image REC signal is input, in operation 1014, the moving image is captured. Although not shown, with respect to another command through the manipulation unit, for example, a command for setting a flash, a command for changing a photographing setting value, etc., the image processor may perform the corresponding command.

In operation 1016, the photographing data is stored in a storage unit of the image processor. The image processor temporarily stores the photographing data in the storage unit connected to the image processor. A quick view image for the photographing data may be displayed on the display unit. When audio is included in video, for example, when the moving image is photographed, the audio data input by the audio unit may be synchronized with moving image data and stored in the storage unit.

In operation 1018, after the main processor is completely booted, in operation 1020, a storage path of the photographing data is changed to a storage unit of the main processor. The image processor may determine whether a booting complete flag of the main processor is set and whether the main processor is completely booted. In some embodiments, when the main processor is completely booted, a booting complete control message may be transmitted to the image processor. When the main processor is completely booted, the image processor changes a storage path of data that is to be captured in the future or the stored photographing data to the storage unit of the main processor. The storage path may be changed by the image processor or the main processor.

In operation 1022, the photographing data stored (at 1016) in the storage unit of the image processor is moved to the storage unit of the main processor. The image processor automatically or sequentially transmits the photographing data stored in the storage unit or a plurality of pieces of photographing data to the storage unit of the main processor.

Referring to FIG. 10 and FIG. 11, if a power key of the electronic apparatus is input, in operation 1100, the main processor starts being booted. In operation 1102, if the main processor is completely booted, in operation 1104, a booting complete flag of the main processor is set.

In operation 1106, a storage path of the photographing data is changed to the storage unit of the main processor.

In operation 1108, it is determined whether the main processor has control authorization of the display unit, the audio unit, and the manipulation unit. When it is determined that the main processor has the control authorization (YES at 1108), in operation 1110, the display unit, the audio unit, and the manipulation unit are controlled, and the captured still image or moving image is stored in the storage unit of the main processor.

In operation 1108, when it is determined that the main processor does not have the control authorization (NO at 1108), in operation 1112, the image processor receives and stores the captured still image or moving image in the storage unit of the main processor.

In operation 1108, whether the main processor has control authorization of the display unit, the audio unit, and the manipulation unit may be determined according to which photographing mode is set. For example, the control authorization is selected according to whether the main processor continuously has control authorization, which is suitable for maintaining performance of the electronic apparatus.

Referring to FIG. 12, after the main processor is completely booted, i.e. after an operation 1022, in operation 1200, it is determined whether a photographing mode of the electronic apparatus is a photographing optimizing mode. In operation 1200, when the photographing mode is the photographing optimizing mode, in operation 1202, the image processor maintains photographing control authorization. In this regard, the photographing optimizing mode is a mode for improving a photographing function of the electronic apparatus, such as improving a display delay of the photographing data or optimizing photographing performance, and may include, for example, an aperture preference mode, a shutter preference mode, a manual mode, a program mode, etc. In this case, the image processor continuously controls display, audio, key input, and a GUI. In this case, the storage path of the still image or moving image photographing data may be set as the storage unit of the main processor.

In operation 1200, when the photographing mode is not the photographing optimizing mode, in operation 1204, the main processor has the photographing control authorization. When the photographing mode is a normal mode or a photographing application execution mode based on an Open OS, the main processor controls the display, the audio, the key input, and the GUI. The storage path of the still image or moving image photographing data is set as the storage unit of the main processor.

Figure 13:
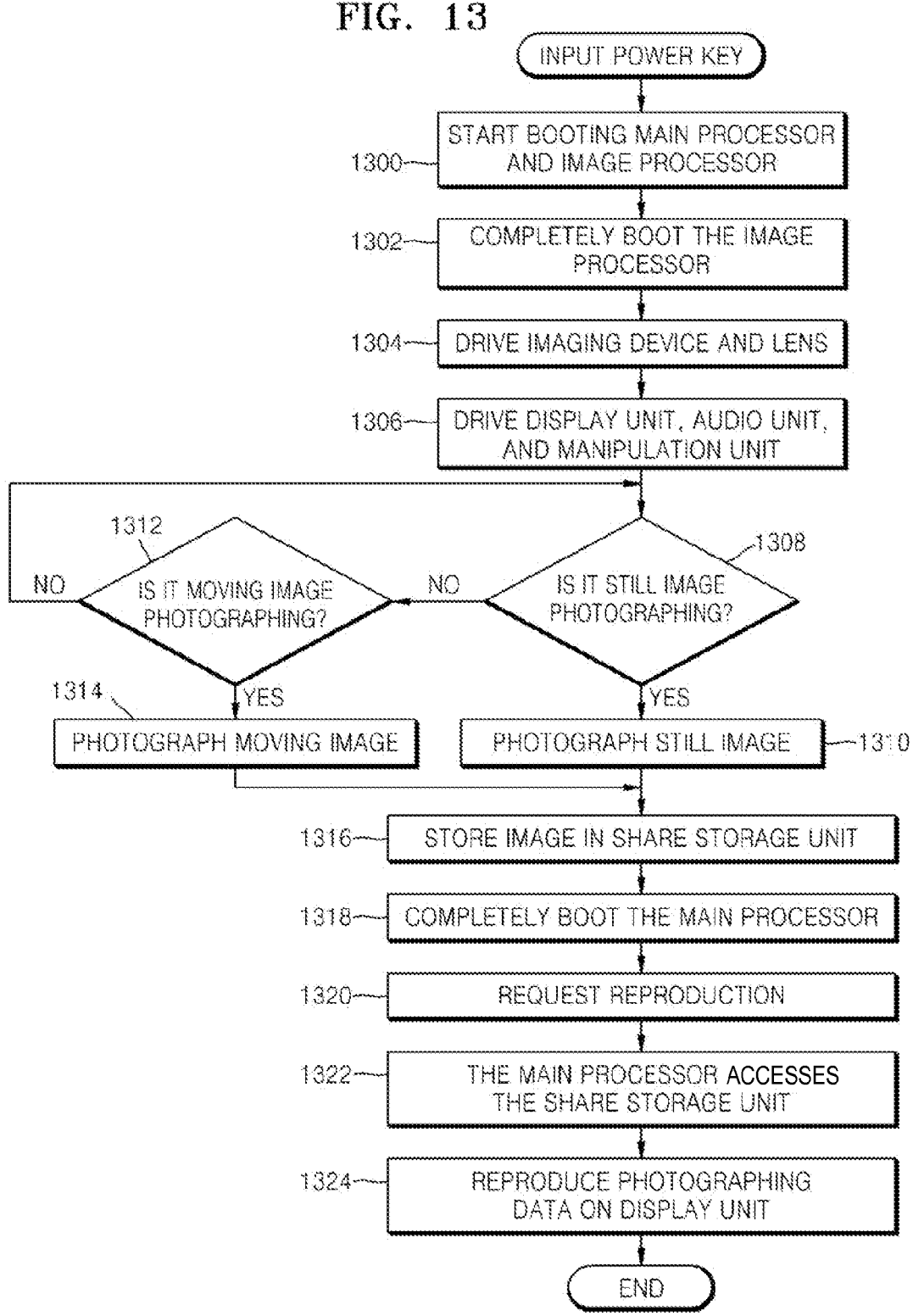
FIG. 13 is a flowchart of a method of controlling an electronic apparatus according to another embodiment.

FIG. 13 is a flowchart of a method of controlling an electronic apparatus according to another embodiment.

Referring to FIG. 13, if a power key is input, in operation 1300, a main processor and an image processor start being booted. In this case, booting may include cold booting or warm booting.

In operation 1302, the image processor is completely booted.

In operation 1304, the image processor drives an imaging device and a lens, and, in operation 1306, drives a display unit, an audio unit, and a manipulation unit.

In operation 1308, if still image photographing is being performed, in operation 1310, a still image is captured.

In operation 1312, if moving image photographing is being performed, in operation 1314, a moving image is captured.

In operation 1316, photographing data is stored in a shared storage unit. The image processor stores the photographing data in the shared storage unit that is shared with the main processor. To display a quick view image for the photographing data, the image processor may display the photographing data stored in the shared storage unit on the display unit. When audio is included in video, for example, when it is moving image photographing, audio data input through the audio unit may be synchronized with moving image data and stored in the shared storage unit.

In operation 1318, the main processor is completely booted.

In operation 1320, the main processor is requested to reproduce the photographing data. When the main processor is completely booted, the main processor receives and processes a reproduction request via the manipulation unit but is not limited thereto. In some embodiments, the image processor may receive and process the reproduction request.

In operation 1322, the main processor accesses the shared storage unit. The image processor may transfer an address of the photographing data stored in the shared storage unit to the main processor. The main processor accesses the corresponding address and reads the stored photographing data.

In operation 1324, the main processor reproduces the read photographing data on the display unit.

Figure 14:
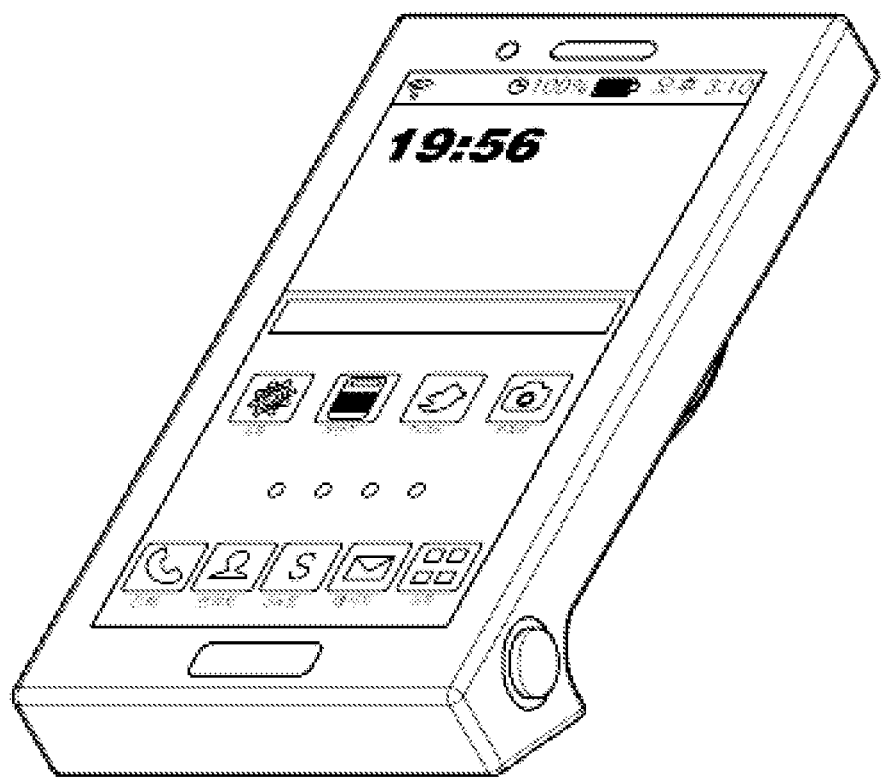
FIG. 14 and FIG. 15 are perspective diagrams of photographing screens according to embodiments.
Figure 15:
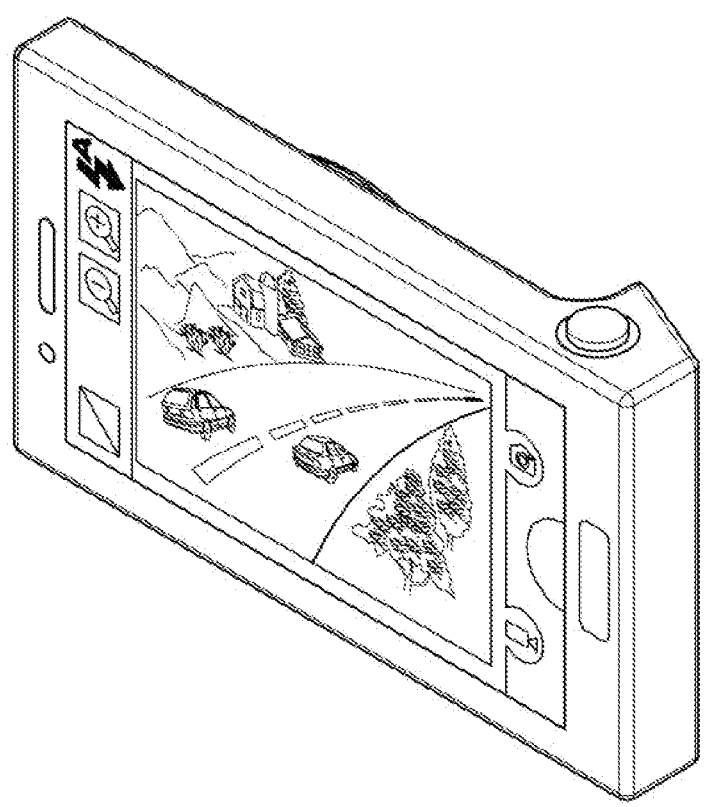

FIG. 14 and FIG. 15 are perspective diagrams of photographing screens according to various embodiments.

Referring to FIG. 14, a main processor provides various application menus, and, if a camera application is executed, controls a photographing operation through an image processor. Referring to FIG. 15, before the main processor is completely booted, when the image processor performs the photographing operation, the image processor may provide a UI for photographing, separately from a UI provided by the camera application of the main processor. Thus, before the main processor is completely booted, the image processor may prepare the UI to quickly perform photographing in accordance with a user's intentions. After the main processor is completely booted, the main processor may execute programs for photographing to prepare for the photographing operation.

An Open OS based main processor and an RTOS based image processor having a shorter booting time than that of the OpenOS based main processor are described in the above embodiments but are not limited thereto. From two processors, one of which that has a shorter booting time than the other may have photographing control authorization, display control authorization, and audio control authorization. Display of photographing data and input/output of audio are described above but are not limited thereto. This may also apply to reproduction display of data stored in a memory or input/output of audio.

According to an embodiment, if a user desires to take a photo by using an electronic apparatus at a desired moment or with very short notice, a photographing operation may be performed to obtain a desired photo or video by completely booting an image processor only, without waiting until a main processor is completely booted.

As described above, according to one or more of the above embodiments, a photographing operation may be rapidly performed before a main processor is completely booted.

All references, including publications, patent applications, and patents, cited herein are hereby incorporated by reference to the same extent as if each reference were individually and specifically indicated to be incorporated by reference and were set forth in its entirety herein.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

The particular implementations shown and described herein are illustrative examples and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The embodiments are not limited to the described order of the steps. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present disclosure have been described with reference to the figures, it will be understood by those of ordinary skill in the art that various changes in form and details may be made therein without departing from the spirit and scope of the invention as defined by the following claims.

What is claimed is:

1. A method of controlling an electronic apparatus comprising a main processor and an image processor, the method comprising:
    booting the main processor and the image processor according to a power input signal of the electronic apparatus;
    when the image processor is completely booted, performing a photographing preparation operation;
    photographing an object, performed by the image processor, in response to a shutter release signal; and
    generating photographing data of the object, performed by the image processors;
    when the main processor is completely booted, determining whether the main processor or the image processor has photographing control authorization according to a photographing mode of the electronic apparatus,
    wherein, when the photographing mode of the electronic apparatus is a normal mode, it is determined that the main processor has the photographing control authorization, and
    when the photographing mode of the electronic apparatus is a photographing optimizing mode, it is determined that the image processor has the photographing control authorization.

2. The method of claim 1, further comprising: storing the generated photographing data in a storage unit of the image processor.

3. The method of claim 2, wherein the storage unit comprises a first storage unit, the method further comprising: determining whether the main processor is completely booted,
    wherein, when the main processor is completely booted, photographing data stored in the first storage unit of the image processor is transmitted to a second storage unit of the main processor.

4. The method of claim 3, wherein it is determined whether the main processor is completely booted based on whether a booting complete flag of the main processor is set.

5. The method of claim 3, further comprising: when the main processor is completely booted, changing a storage path of photographing data that is to be captured to the second storage unit of the main processor.

6. The method of claim 1, wherein the photographing preparation operation comprises at least one of driving of a lens unit and an imaging device, driving of a display unit that displays the photographing data, driving of an audio unit that controls input/output of audio data included in the photographing data, driving of a user interface unit for photographing the object, or driving of a manipulation unit that receives the shutter release signal.

7. The method of claim 1, wherein, when it is determined that the image processor has the photographing control authorization, the image processor controls driving of a display unit that displays the photographing data, driving of an audio unit that controls input/output of audio data corresponding to the photographing data, driving of a user interface unit for photographing the object, and driving of a manipulation unit that receives the shutter release signal.

8. The method of claim 1, wherein, when it is determined that the main processor has the photographing control authorization, the main processor controls driving of a display unit that displays the photographing data, driving of an audio unit that controls input/output of audio data corresponding to the photographing data, driving of a user interface unit for photographing the object, and driving of a manipulation unit that receives the shutter release signal.

9. The method of claim 1, further comprising: storing the generated photographing data in a shared storage unit.

10. The method of claim 9, further comprising: after the main processor is completely booted,
receiving a reproduction request for the photographing data, performed by the main processor; and
outputting the stored photographing data on a display unit by accessing the shared storage unit, performed by the main processor.

11. The method of claim 9, wherein the shared storage unit is implemented in a chip along with the image processor.

12. The method of claim 9, wherein the shared storage unit is implemented in a chip along with the main processor.

13. The method of claim 1, wherein the photographing data comprises still image data or moving image data.

14. The method of claim 1, wherein, according to whether the main processor is completely booted, one of the image processor and the main processor has display control authorization for displaying the generated photographing data on a display unit.

15. The method of claim 1, wherein the main processor is an application processor.

16. A non-transitory computer-readable recording medium having recorded thereon a computer program for executing the method of claim 1.

17. An electronic apparatus comprising:
a main processor and an image processor;
wherein the main processor and the image processor start being booted according to a power input signal of the electronic apparatus, and
when the image processor is completely booted, the image processor performs a photographing preparation operation, photographs an object in response to a shutter release signal, and generates photographing data of the object;
wherein, when the main processor is completely booted, the electronic apparatus determines whether the main processor or the image processor has photographing control authorization according to a photographing mode of the electronic apparatus,
when the photographing mode of the electronic apparatus is a normal mode, the electronic apparatus determines that the main processor has the photographing control authorization, and
when the photographing mode of the electronic apparatus is a photographing optimizing mode, the electronic apparatus determines that the image processor has the photographing control authorization.

18. The electronic apparatus of claim 17, further comprising:
a first storage unit communicatively connected to the image processor; and
a second storage unit communicatively connected to the main processor,
wherein the image processor stores the photographing data in the first storage unit.

19. The electronic apparatus of claim 18, wherein the image processor determines whether the main processor is completely booted, and, when the main processor is completely booted, transmits photographing data stored in the first storage unit to the second storage unit.

20. The electronic apparatus of claim 19, wherein the image processor determines whether the main processor is completely booted based on whether a booting complete flag of the main processor is set.

21. The electronic apparatus of claim 19, wherein, when the main processor is completely booted, the image processor changes a storage path of photographing data that is to be captured to the second storage unit.

22. The electronic apparatus of claim 17, further comprising:
a lens unit, an imaging device, a display unit that displays the photographing data, an audio unit that controls input/output of audio data corresponding to the photographing data, a user interface unit for photographing the object, and a manipulation unit that receives the shutter release signal;
wherein the photographing preparation operation performed by the image processor comprises at least one of driving of the lens unit and the imaging device, driving of the display unit, driving of the audio unit, driving of the user interface unit, or driving of the manipulation unit.

23. The electronic apparatus of claim 17, wherein, when the electronic apparatus determines that the image processor has the photographing control authorization, the image processor controls driving of a display unit that displays the photographing data, driving of an audio unit that controls input/output of audio data corresponding to the photographing data, driving of a user interface unit for photographing the object, and driving of a manipulation unit that receives the shutter release signal, and
wherein, when the electronic apparatus determines that the main processor has the photographing control authorization, the main processor controls driving of the display unit that displays the photographing data, driving of the audio unit that controls input/output of audio data corresponding to the photographing data, driving of the user interface unit for photographing the object, and driving of the manipulation unit that receives the shutter release signal.

24. The electronic apparatus of claim 17, further comprising: a shared storage unit for storing the generated photographing data.

25. The electronic apparatus of claim 24, wherein, after the main processor is completely booted, when the main processor receives a reproduction request for the photographing data, the main processor outputs the stored photographing data on a display unit by accessing the shared storage unit.

26. The electronic apparatus of claim 24, wherein the shared storage unit is implemented in a chip along with the image processor.

27. The electronic apparatus of claim 24, wherein the shared storage unit is implemented in a chip along with the main processor.

28. The electronic apparatus of claim 17, wherein the main processor and the image processor are implemented in a same chip.

* * * * *